April 18, 1967    R. MYON    3,314,757
METHODS OF CONCENTRATING PHOSPHORIC ACID
Filed March 4, 1963
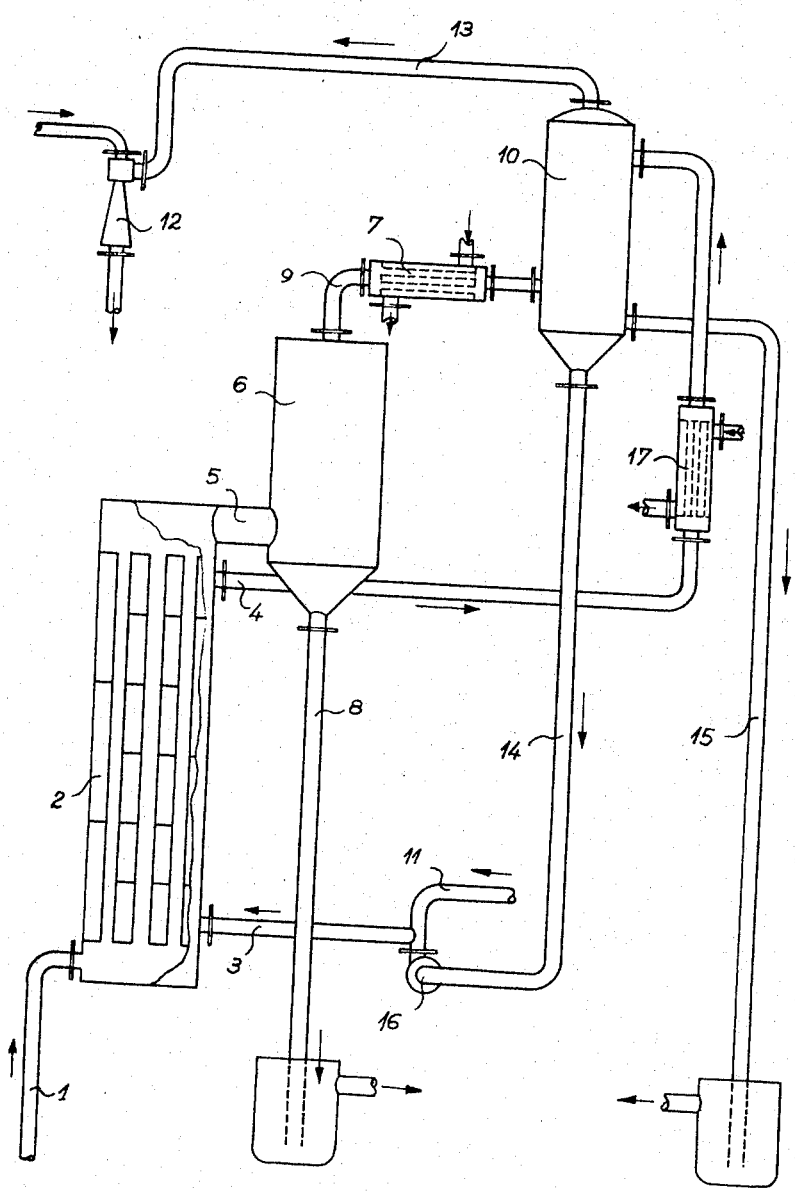
Inventor
René Myon
By Stevens Davis Miller & Mosher
Attorneys

United States Patent Office 3,314,757
Patented Apr. 18, 1967

3,314,757
METHODS OF CONCENTRATING PHOSPHORIC ACID
René Myon, Lille, Nord, France, assignor to Appareils et Evaporateurs Kestner, Lille, Nord, France, a French corporation
Filed Mar. 4, 1963, Ser. No. 262,420
Claims priority, application France, Jan. 8, 1963, 920,805, Patent 1,352,951
4 Claims. (Cl. 23—165)

In plants for producing phosphoric acid by attacking crude tribasic calcium phosphate with sulfuric acid, an acid having a general concentration approximating 30% of phosphorous pentoxide, $P_2O_5$ is obtained. To meet the requirements of sales standards and also for industrial use of this acid, the latter is frequently concentrated to a 50% phosphorous pentoxide content. Throughout the specification and claims, all percents are weight percents.

This concentration is carried out either in steam-heated tubular evaporators of known type, or in concentrators in which high-temperature gases are caused to contact the acid directly, this last type of apparatus having the very serious drawback that large quantities of acid gases are vented to the atmosphere. This drawback is eliminated when using tubular evaporators.

Whatever type of evaporator is used, this concentration operation is extremely costly. In fact, for raising to 50% the phosphorous pentoxide content of a quantity of phosphoric acid consisting of 1,000 kilograms of $P_2O_5$ and 2,333 kilograms of water, which acid is therefore concentrated to 30% of $P_2O_5$, it is necessary to evaporate 1,333 kilograms of water. This operation involves a consumption of about 1,700 kilograms of steam, in the case of a tubular evaporator, or 100 kilograms of fuel-oil, in the case of an evaporator providing a direct contact with hot gases.

As a rule, in the same phosphoric acid manufacturing processes use is made of sulfuric acid delivered by manufacturers at a 98% $H_2SO_4$ content, but before this acid is introduced into the manufacturing process proper it is mostly diluted to reduce its $H_2SO_4$ content to 70%, a figure much more consistent with manufacturing requirements. The direct use of a 98% concentration acid would be a source of trouble in manufacture. As a rule this water dilution is effected in a special dilution apparatus.

It is the essential object of this invention to provide a method of concentrating phosphoric acid, wherein the steps of concentrating the phosphoric acid and diluting the sulfuric acid used in the manufacture of low-concentration phosphoric acid are associated in a particularly economical manner.

This method is characterized in that the concentration is effected in vacuum in an evaporator consisting of a surface-type heat transfer apparatus while the water vapor from the evaporation is collected by condensation in the concentrated sulfuric acid, and that the heat developed by the vapor condensation and by the sulfuric acid dilution is used for heating said evaporator by utilizing as a heating fluid the diluted sulfuric acid having absorbed the evaporated water.

The invention will now be described with reference to the attached drawing of which the single figure illustrates diagrammatically by way of example an apparatus for carrying out the method set forth hereinabove, this apparatus forming likewise part of the present invention.

The apparatus is supplied with phosphoric acid to be concentrated through a pipe 1 leading into the inlet chamber of an evaporator 2 consisting of a surface-type heat exchanger and comprising an inlet pipe 3 and an outlet pipe 4 for heating fluid.

In the typical example illustrated in the drawing the evaporator is of the tubular nest type wherein the tubular nest is surrounded by baffle means whereby the heating fluid is caused to follow a sinuous path with a view to promote the heat transfer process. The tubes in the upper portion of the apparatus open into an outlet chamber connected through a vapor duct 5 to a separator 6 comprising at its lower portion a duct 8 for delivering the concentrated phosphoric acid and at its upper portion another duct 9 for discharging the vapor through a cooler 7 and a mixer-type condenser 10. The use of cooler 7 is optional.

A vacuum pump 12 connected through a pipe 13 to the upper portion of condenser 10 produces the necessary vacuum in the installation and removes the noncondensable gases.

Furthermore, the condenser is so connected to the heating-fluid pipes 3 and 4 of evaporator 2 that a pump 16 interposed in one of these pipes will circulate this fluid (which, according to the method of this invention, is sulfuric acid) in the condenser and the evaporator. A feed pipe 11 branched off one point of the circuit thus constituted is provided for supplying concentrated sulfuric acid to the apparatus.

In the specific example illustrated in the drawing the condenser 10, a pipe 14, the pump 16, pipe 3, the evaporator 2, and pipe 4 are disposed in series in the normal direction of the circulation of the sulfuric acid, and supply pipe 11 is connected to the delivery side of pump 16.

A duct 15 is provided on condenser 10 for discharging the diluted sulfuric acid.

The pipes 4, 9 and 14 lead into the condenser 10 in such a manner that an intimate contact is created between the concentrated sulfuric acid and the vapor issuing from separator 6.

Under these conditions, the condenser 10 may consist for example of a bubbling column or a washer-type shower column.

Surface-type heat exchange or transfer apparatus 7 may be inserted either in pipe 9 and/or in the sulfuric acid circuit, for instance in pipe 4 as indicated by numeral 17.

Finally, the ducts 8 and 15 for discharging the concentrated phosphoric acid and diluted sulfuric acid are equipped with, or lead into, devices of conventional design for counterbalancing the atmospheric pressure, due account being taken of the vacuum prevailing in the apparatus. In the specific form of embodiment illustrated these devices consist of ducts 8 and 15 having their open lower ends immersed in collector vessels, their height being sufficient to enable the pressure exerted by the acid column contained therein to counterbalance the atmospheric pressure.

The method of this invention may be carried out in the apparatus described hereinabove as follows:

The phosphoric acid to be concentrated enters the evaporator 2 through the feed line 1 and flows along the heated tubes. The evaporation vapor thus produced separates from the concentrated phosphoric acid in the separator, the concentrated acid issuing through the duct 8, the evaporation vapor issuing through duct 9 and being subsequently condensed in the mixer-type condenser 10 which constitutes a liquid-gas contact zone. In this vacuum condenser the sulfuric acid undergoing the dilution is circulated, this dilution being actually effected by the water vapor produced in the evaporator. Due to the condensation of the water vapor by the acid and to the dilution thus effected, the sulfuric acid is heated considerably and the evaporator is heated by the heat stored by this acid.

To this end, the heated acid is drawn by the pump 16 and delivered through the nest and externally of the evaporator tubes.

The concentrated sulfuric acid is delivered to the circuit through pipe 11 and the diluted acid is extracted from the condenser through duct 15.

The non-condensable gases are drawn by a vacuum pump 12 also adapted to create the necessary vacuum in the installation.

If desired, the exchanger 17 inserted in line 4 and adapted to heat or cool a fluid medium will compensate both the heat available in the circulating sulfuric acid and the heat necessary for evaporating the water from the phosphoric acid.

As a rule, surplus heat is available in this case and any heat excess is eliminated by the water-cooled heat transfer device 17.

The exchanger 7 inserted in duct 9 acts as an auxiliary condenser by permitting the condensation of a small quantity of vapor through auxiliary means, such as a water circulation, in case the quantity of steam corresponding to the phosphoric acid evaporation were in excess to the sulfuric acid absorption capacity.

As a rule, the state of equilibruim is nearly attained regarding on the one hand the amount of heat available (which in most cases is slightly in excess) and on the other hand the water absorption capacity of sulfuric acid; in other words, the heat transfer devices 7 and 17 are not used.

The practical example described hereafter will illustrate a concrete application of the method of this invention. In this example, a plant is assumed to treat Morocco phosphate containing 34 to 35% $P_2O_5$, this phosphate having such contents of acid soluble salts that the sulfuric acid consumption, considering the normal losses during the manufacturing process, is 2,950 kilograms per 1,000 kilograms of $P_2O_5$.

This sulfuric acid is delivered to the plant at a 98% $H_2SO_4$ concentration.

The dilute phosphoric acid is produced at a 30% $P_2O_5$ content and it is desired to increase it to 50% $P_2O_5$.

Therefore, the quantity of water to be evaporated per ton of $P_2O_5$ is:

$$\frac{1,000}{.3} - \frac{1,000}{.5} = 1,333 \text{ kilograms}$$

Assuming that the sulfuric acid is diluted to 70% $H_2SO_4$, which is a convenient value for delivering it to a manufacturing process, it will be seen that during the same time the quantity of water taken by the sulfuric acid will be:

$$\frac{2,950}{.70} - \frac{2,950}{.98} = 1,204 \text{ kilograms}$$

In other words, in this example 1,333–1,204 kilograms of vapor will have to be eliminated through the condenser 10 or any other means.

When instead of the relatively rich Moroccan phosphates, Tunisian or similar phosphates are used, for example, the relative consumption of sulfuric acid will increase as well as the possibility of water collection; in other words, the quantity of vapor to be condensed decreases and may even drop to zero.

As to the heat necessary for carrying out the evaporation and which is available in the circulating acid, it is constantly in excess.

By way of example, considering the same case as hereinabove and assuming that the dilute phosphoric acid is introduced into the evaporator at a temperature of 40° C. (104° F.) and is delivered therefrom in a concentrated state and at a temperature of 60° C. (140° F.), the evaporation must be effected under an absolute pressure of 60 mm. Hg. Under these conditions, the evaporation of 1 kilogram of water necessitates the supply to the evaporator of about 600 cal./kg. of evaporated water, that is, in relation to 1,000 kilograms of $P_2O_5$:

$$1,333 \times 600 = 800,000 \text{ calories}$$

whereas the quantity of heat available in the sulfuric acid is calculated as follows:

| | Calories |
|---|---|
| Vapor condensation heat | $565 \times 1,204 = 680,000$ |
| Sulfuric acid dilution heat (calculated at the rate of 100 cal. per kg. of $H_2SO_4$ for dissolving 98% to 70% $H_2SO_4$) | $2,950 \times 100 = 295,000$ |
| Total | 975,000 | which means that 975,000−800,000 calories=175,000 calories will have to be eliminated through the heat transfer device 17.

Regarding the heat transfer conditions in the tubular nests of evaporator 2, the following conditions corresponding to an operation under an absolute pressure of 60 mm. Hg will be found:

| | |
|---|---|
| Input temperature of phosphoric acid | 40° C. (104° F.) |
| Output temperature of phosphoric acid | 60° C. (140° F.) |
| Temperature of the sulfuric acid delivered to the evaporator, corresponding to a 60-mm. Hg pressure, for an acid concentrated at 70% $H_2SO_4$ | 95° C. (203° F.) |

The above temperature values are given by way of example only. Of course, these rated temperatures may vary as a function of the absolute pressure under which the process is carried out and they may be either reduced by reducing this pressure accordingly, that is, by increasing the vacuum, or increased by increasing the vapor tension accordingly, that is, by reducing the vacuum.

I claim:

1. A process for producing concentrated phosphoric acid containing about 50 weight percent $P_2O_5$, comprising the steps of digesting crude phosphate rock with sulphuric acid of about 70 weight percent $H_2SO_4$ to obtain dilute phosphoric acid containing about 30 weight percent $P_2O_5$, vaporizing steam from said dilute phosphoric acid by indirect heat exchange with hot sulphuric acid in an evaporation zone which is maintained under vacuum to form a mixture of steam and concentrated phosphoric acid containing about 50 weight percent $P_2O_5$, separating said steam from said concentrated phosphoric acid, withdrawing said concentrated phosphoric acid as a product of the process, introducing the separated steam into a liquid-gas contact zone under vacuum, introducing into said contact zone sulphuric acid from said evaporation zone, absorbing the steam into said sulphuric acid in said contact zone to dilute said sulphuric acid to a concentration of about 70 weight percent $H_2SO_4$ thereby heating the sulphuric acid, separating the sulphuric acid of about 70 weight percent $H_2SO_4$ into two streams, recycling one of said streams to the digesting step, mixing the other of said streams with fresh concentrated sulphuric acid, and passing the resulting sulphuric acid to said evaporation zone to concentrate additional phosphoric acid.

2. A process according to claim 1, wherein said dilute phosphoric acid is introduced into said evaporation zone at a temperature of about 40° C.

3. A process according to claim 2, wherein the temperature of the sulphuric acid introduced into said evaporation zone is about 95° C.

4. A process according to claim 3, wherein the vacuum corresponds to an absolute pressure of about 60 mm. Hg.

(References on following page)

References Cited by the Examiner

UNITED STATES PATENTS

| | | | |
|---|---|---|---|
| 393,428 | 11/1888 | Giles et al. | 23—165 |
| 2,368,588 | 1/1945 | Worthen et al. | 159—17 |
| 2,611,681 | 9/1952 | Bellinger et al. | 23—165 |
| 2,741,584 | 4/1956 | Holmes et al. | 202—64 |
| 2,749,291 | 6/1956 | Pierotti et al. | 202—39 |
| 2,807,521 | 9/1957 | Lambe et al. | 23—165 |
| 2,818,372 | 12/1957 | Hood et al. | 202—57 |
| 2,865,920 | 12/1958 | Stark | 159—17 |
| 2,905,535 | 9/1959 | Atkin et al. | 23—165 |
| 2,990,341 | 6/1961 | Graybill | 202—46 |
| 3,073,677 | 1/1963 | Malley et al. | 23—165 |

OSCAR R. VERTIZ, *Primary Examiner.*

MAURICE A. BRINDISI, MILTON WEISSMAN, *Examiners.*

O. F. CRUTCHFIELD, *Assistant Examiner.*